United States Patent [19]
Lonardi et al.

[11] Patent Number: 5,749,820
[45] Date of Patent: May 12, 1998

[54] SUSPENSION DEVICE FOR A ROTATING BODY

[75] Inventors: Emile Lonardi, Bascharage; Giovanni Cimenti, Fentange, both of Luxembourg

[73] Assignee: Paul Wurth S.A., Luxembourg

[21] Appl. No.: 764,534

[22] Filed: Dec. 12, 1996

[51] Int. Cl.$^6$ .................................................. F16C 19/30
[52] U.S. Cl. ..................... 384/620; 384/622; 384/549
[58] Field of Search ................................. 384/620, 622, 384/549, 621, 618

[56] References Cited

U.S. PATENT DOCUMENTS 3,679,035  7/1972  Schmitt ............................. 384/549
5,087,133  2/1992  Jacob et al. ........................ 384/549

*Primary Examiner*—Lenard A. Footland
*Attorney, Agent, or Firm*—Fishman, Dionne, Cantor & Colburn

[57] ABSTRACT

A suspension device for a heavy body, such as a rotating hopper for a shaft furnace, is presented. The suspension device has an annular running surface, a number (n) of rollers greater than three, and an elastically compressible component to permit elastic deformations sufficient substantially to correct an unequal distribution of weight of the heavy body over the rollers resulting from slight defects in the coplanarity of the rollers.

23 Claims, 4 Drawing Sheets

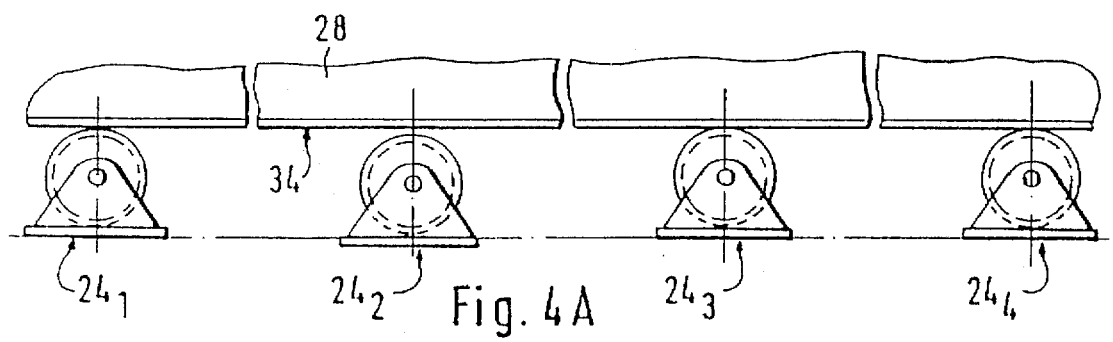
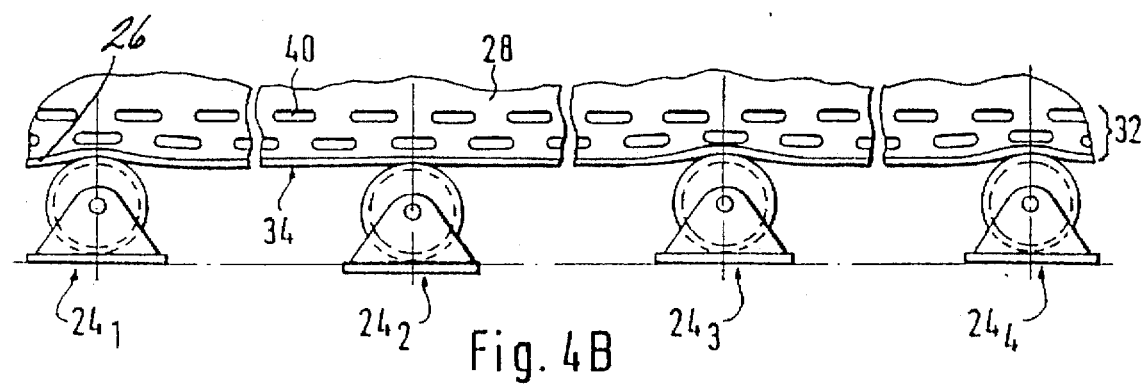
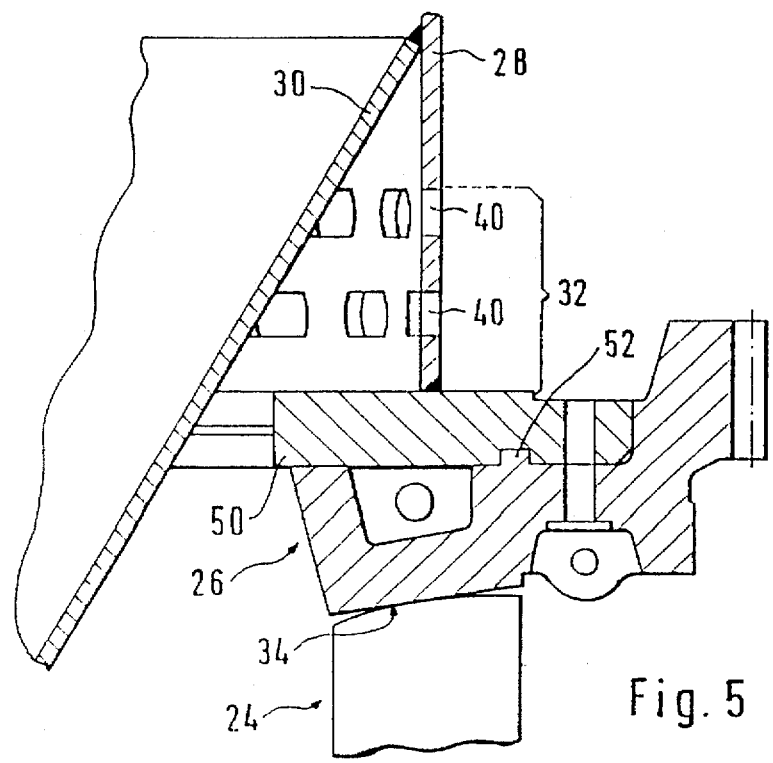

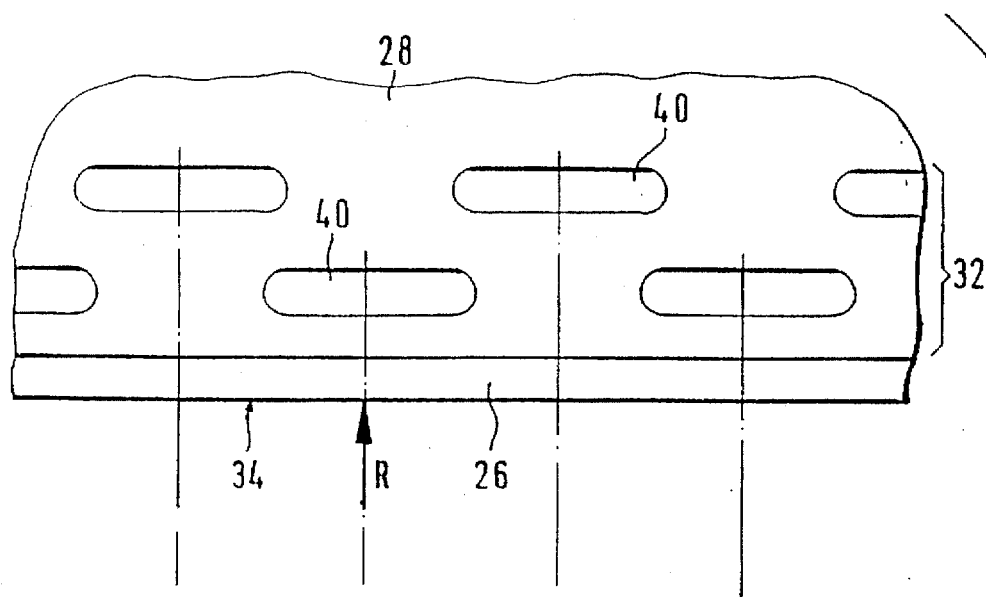
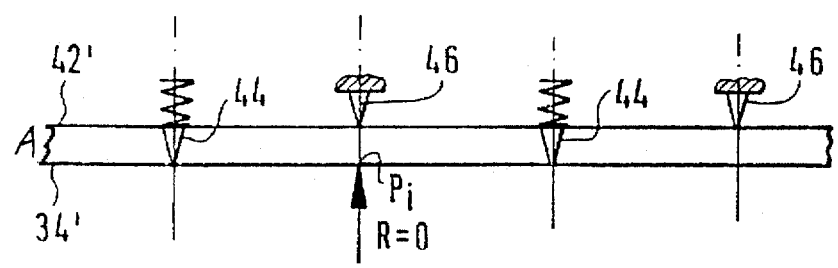
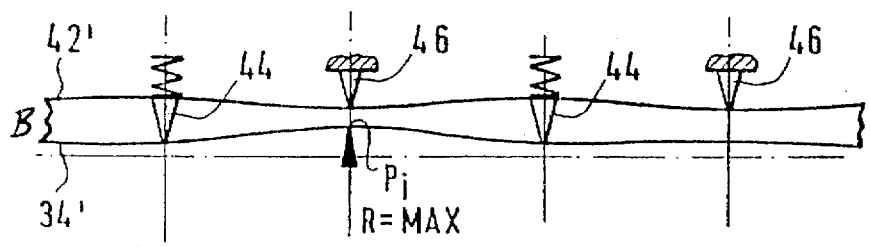
Fig. 6

5,749,820

SUSPENSION DEVICE FOR A ROTATING BODY

Relation To Other Applications:

This is a continuation of International Application PCT PE95/01717, International Filing Date of May 5, 1995.

BACKGROUND OF THE INVENTION

The invention relates to a suspension device for a heavy body rotating about a substantially vertical axis, such as a rotating hopper for example. More particularly this invention relates to a suspension device which comprises, on one side, a metallic running strip defining an annular running surface and, on the other side, at least n rollers, where n is an integer greater than 3, these n rollers being arranged in such a way as to press on the running surface in order to support the rotating body.

A rotary suspension device is known, for example, from US-A-4,812,100 in which it is described in connection with a rotating hopper of a shaft furnace. Such a rotating hopper weighs, when it is loaded, several hundred tons. If three supporting rollers separated from each other by 120° were used, each roller should be dimensioned so as to take up at least one third of the weight of the hopper. Now, it is of course important to work with rollers that are as small as possible. Hence the idea of working with more than three rollers. However, this idea raises problems as regards its practical realization. In effect, if the case in which the hopper is supported by four rollers separated from each other by 90° is analyzed, it is realized that instead of being able to dimension each roller to take up 25% of the weight of the hopper, each roller must be dimensioned so as to take up at least 50% of the weight of the hopper. This paradox is due to the fact that the four rollers are never actually strictly aligned in the same plane.

In U.S. Pat. No. 4,812,100, the problem of the distribution of the weight of the hopper over more than three rollers is solved by providing four pairs of rollers fitted with a special suspension. The rollers of one pair are in effect carried by an axle capable of pivoting about a radial axis and, each of the rollers is mounted in its axle using floating bearings fitted with springs.

SUMMARY OF THE INVENTION

In accordance with the present invention there is proposed a suspension device for a heavy rotating body which is much simpler than the device described in US-A-4,812,100 and which is nevertheless suitable for substantially correcting an unequal distribution of the weight of the heavy body over more than three rollers.

According to the present invention, the weight distribution problem is solved by compressible elastic means which are positioned above the running strip so that the running surface has elastic deformations about the points of contact between the rollers and the running surface. These elastically compressible means are moreover dimensioned so that the elastic deformations of the running surface are sufficient substantially to correct an unequal distribution of the weight of the heavy body over the rollers resulting from slight defects in the coplanarity of the rollers.

The present invention has the advantage that the suspension of the n rollers can be much simpler than that described in US-A-4,812,100 while guaranteeing adequate results from the point of view of distributing the load among the n rollers.

The present invention proposes elastically compressible means which are entirely metallic. According to a preferred embodiment of the invention, these elastically compressible means comprise in effect a metallic strip provided with oblong holes parallel to the running surface. It will be appreciated that this is a solution particularly simple to produce, which costs almost nothing, which requires no maintenance and which has excellent characteristics from the point of view of elastic deformations.

The device according to the present invention advantageously comprises a supporting cylinder which is coaxial with the axis of rotation and has a high rigidity, an annular attaching flange supported by a first end of the supporting cylinder and a running strip fixed to the attaching flange. The supporting cylinder then has, near the attaching flange, oblong holes parallel to the running surface. When this solution is applied to a rotating hopper, the supporting cylinder forms, for example, the cylindrical wall of the hopper. It will also be noted that the running strip can either be fixed to the rotating body or be fixed to the supporting structure, and the rollers are then mounted, respectively, either on the supporting structure or the rotating body.

Other features and advantages of the invention will be understood by those skilled in the art from the following detailed description of a preferred embodiment of the invention, applied as an example to a rotating hopper of a blast furnace, and from the following drawings.

BRIEF DESCRIPTION OF THE DRAWINGS

Referring now to the drawings, in which like elements are numbered alike in the several FIGURES:

FIG. 4A is a linear depiction of a prior art suspension system with four rollers;

FIG. 4B is a linear depiction of the system of FIG. 4A modified to conform to the invention;

FIG. 5 is an enlarged view of the area marked "V" in FIG. 1 showing a cross-section in a vertical plane through the suspension device according to the invention of the rotating hopper of FIG. 1;

FIG. 6 serves to explain schematically with the help of two diagrams, the deformations of the running surface in a preferred embodiment of the device of to the invention.

DESCRIPTION OF THE PREFERRED EMBODIMENTS

Figure 1:
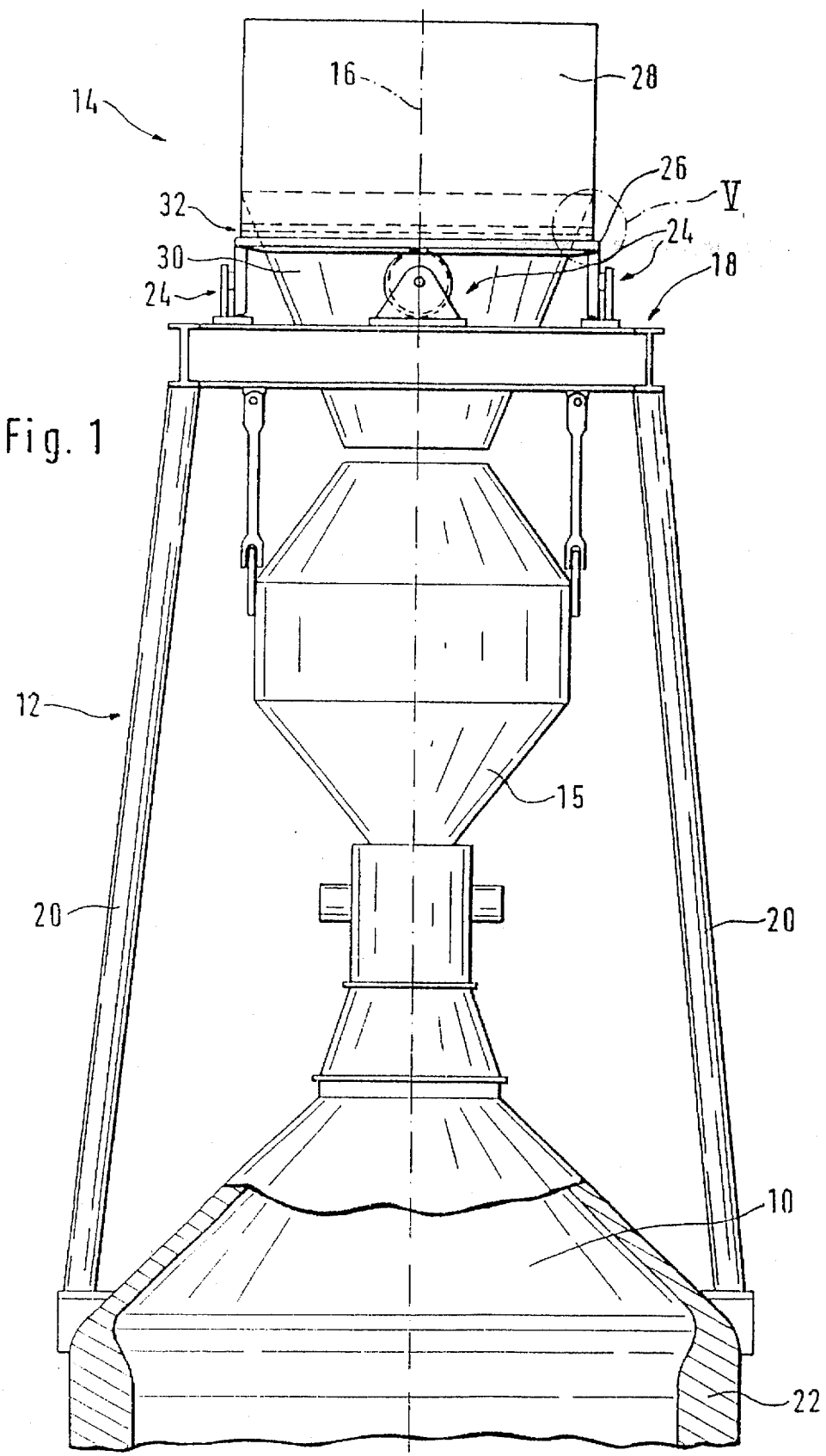
FIG. 1 is an elevation view of a blast furnace equipped with a rotating hopper fitted with a suspension device according to the present invention.

FIG. 1 shows the upper part of a blast furnace 10 equipped with a charging device 12 with a central feed. This charging device 12 includes an auxiliary hopper denoted generally by the reference number 14. Hopper 14 is a rotating hopper which can rotate about the central axis 16 of the blast furnace 10, in order to avoid an asymmetrical feeding of a batch hopper 15 located below the auxiliary hopper 14.

Auxiliary hopper 14 is mounted on a platform 18 which, in turn, is supported by a superstructure 20. Superstructure 20 is supported on the wall 22 of blast furnace 10. Hopper 14 is suspended over the platform 18 by means of four rollers 24 mounted on the platform 18. Rollers 24 press on an annular running strip 26 which surrounds the hopper 14 and is firmly attached to hopper 14.

It can also be seen from FIGS. 1 and 5 that hopper 14 has an upper part, comprising a cylindrical wall 28, and a lower part, comprising a tapered wall 30. Running strip 26 is fixed to an attaching flange 50 at the lower edge of the cylindrical wall 28. This lower edge protrudes slightly beneath the junction between the cylindrical wall 28 and the tapered wall 30 to form a skirt around the upper part of tapered wall 30. Such a hopper 14 of a charging unit 12 for a blast furnace 10 weighs, when it is loaded, several hundred tons. This weight has to be borne by the supporting rollers 24 in order to be transmitted through platform 18 and superstructure 20 to wall 22 of blast furnace 10.

Figure 2:
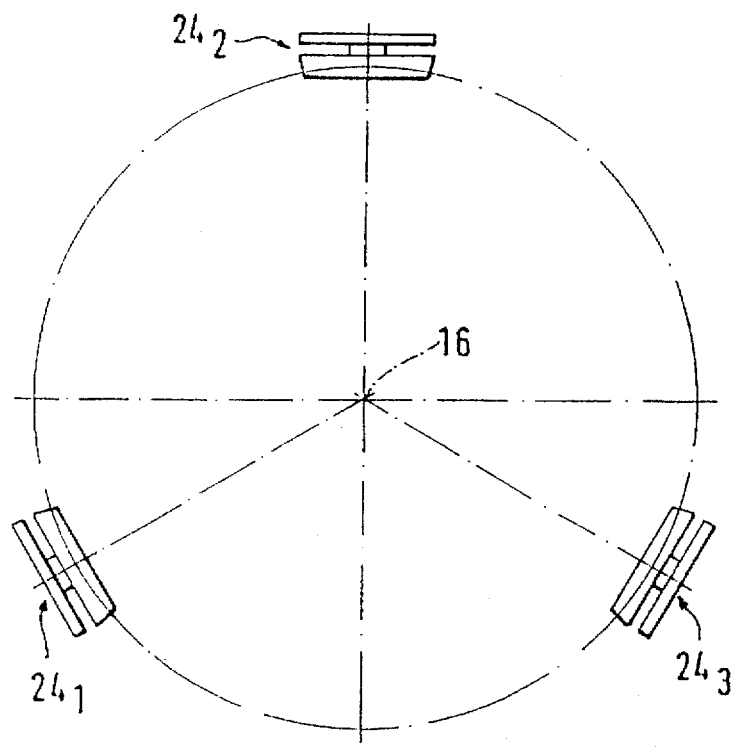
FIGS. 2 and 3 illustrate the problem of the prior art and which is at the root of the invention; they show in a plan view a device with three supporting rollers (FIG. 2) or with four supporting rollers (FIG. 3) respectively.
Figure 3:
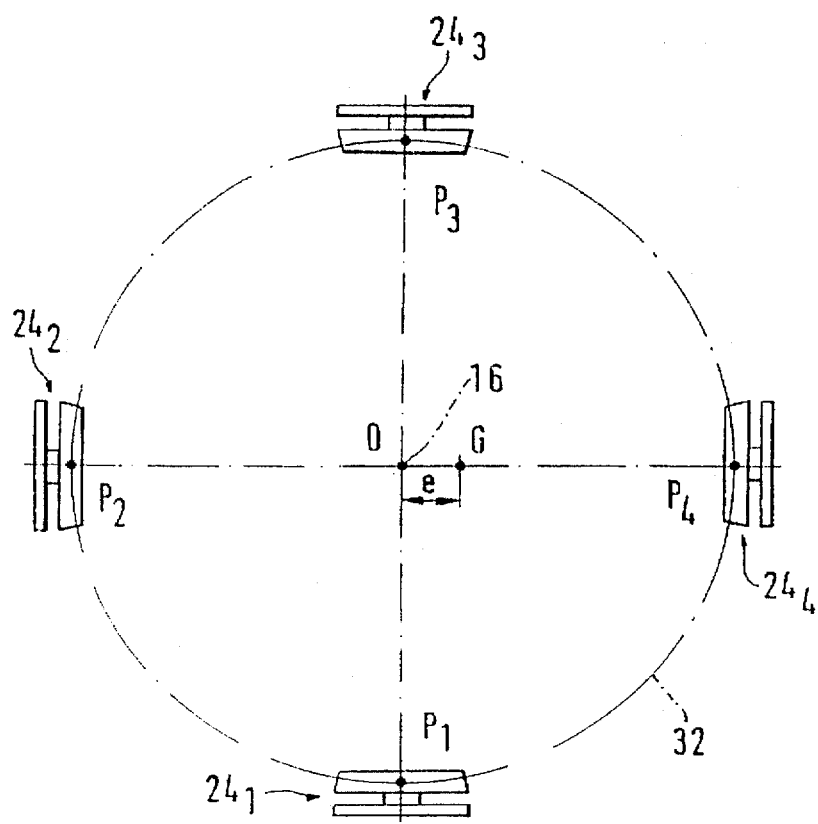

The problem at the root of the present invention will be discussed by referring to FIGS. 2, 3 and 4A (which represent the prior art). In FIG. 2 three supporting rollers separated from each other by 120° can be seen. The rotation axes of the three rollers have a point of intersection on the axis 16. It is obvious that in this arrangement the three rollers $24_1$, $24_2$ and $24_3$ each support a third of the total weight of the hopper 14 when the center of gravity of the hopper is located on the axis 16. At first sight, it would therefore be expected that in the case of FIG. 3 each of the four rollers $24_1$, $24_2$, $24_3$ and $24_4$ would support a quarter of the total weight. In practice, however, this is not the case. This is because the four points $P_1$, $P_2$, $P_3$ and $P_4$ of the rollers 24, which represent the potential points of contact between the rollers $24_1$, $24_2$, $24_3$ and $24_4$ and the running strip 26, are never strictly located in the same plane. As a result, the running surface presses on only three rollers. In FIG. 4A, which is a linear development of the device of FIG. 3, it is the rollers $24_1$, $24_3$ and $24_4$ which are in contact with the running surface. In FIG. 3, it can be seen that the projection G of the center of gravity of the hopper 14 is located on the radius $[O, P_4]$ at a distance "e" from the point O. It is then easy to check that the reactions at the rollers are as follows:

$$R_2=0;\ R_4=(2e/D) * P;\ R_1=R_3=(P/2) * (1-e/D)$$

where D is the mean diameter of the running surface 34.

Now, the ratio e/D is generally very small (in other words, the radial displacement from O of the center of gravity G of the hopper 14 is small), which means that each of the four rollers should be dimensioned so as to take up 50% of the weight of the hopper. It is also important to indicate that in the prior art the running strip 26, which is fixed to the lower front edge of the cylinder 28 with a vertical axis on axis 16, can be likened to the sole or flange of an almost infinitely rigid beam. In other words, in the prior art the running strip 26 has virtually no deformation range or capability.

FIGS. 4B and 5 show the suspension device which, while having four rollers, has been modified in accordance with the present invention. It will be noted that the running strip 26 has been mounted on flange 50, which, in turn, is mounted on an elastically compressible element 32, which forms the lower part of cylindrical wall 38, in such a way that the running surface 34 of the running strip 26 (i.e., the surface of strip 26 in contact with rollers 24) can now have elastic deformations locally around the points of contact $P_i$ between the rollers 24 and the running surface 26. The whole system consisting of the running strip 26 and the elastically compressible element 32 has been dimensioned more especially so that these local elastic deformations of the running surface 34 at the position of each of the rollers 24 are sufficient substantially to correct an unequal distribution of the weight of the hopper 14 over the four rollers 24. As a result of these preprogrammed local deformations, the running surface 34 has yielded under the rollers $24_1$ and $24_3$ where, in FIG. 4A, the reactions $R_1$, and $R_3$ each represented about 50% of the total weight of the hopper 14. Due to these local deformations at the rollers $24_1$ and $24_3$, the compressible element 32 of wall 28 compresses slightly at the sites of contact with rollers $24_1$ and $24_3$. The roller $24_2$ therefore comes in contact with the running surface 34 and bears part of the load. Thus, a considerable redistribution of the weight of the hopper among the four rollers is achieved. In other words, the element 32 confers on the metallic running strip 26 an elastic capability sufficient to correct the effect of defects in the coplanarity of the four rollers $24_i$ through local deformations and in this way to obtain a better distribution of the weight of the hopper 14 over the four rollers 24.

Other important construction features of the proposed device will be described with reference to FIG. 5, which represents, in a cross-section, an enlargement of that region of the hopper 14 surrounded by circle V in FIG. 1. It can be seen that an annular attaching flange 50 is welded to the deformable element 32. The running strip 26 is screwed to this attaching flange 50. Running strip 26 is also advantageously divided into 5 annular sectors each of 72°. Thus, there are never two rollers pressing on the same sector of the running strip, nor are there ever two rollers located at a joint between two of these sectors. Such a segmentation of the running strip 26 into n+1 segments has as a result a beneficial effect on the "penetration" of the reactions of the rollers into the running surface 34. A recess 52 around the circumference of attaching flange 50 also ensures an easy and adequate positioning of the different segments of the running strip on the flange 50. The segments can in effect be considered as expendable parts which should be regularly replaced. The running strip 26 defines a conical running surface 34. The apex of the cone which generates this surface is located below the running surface and on the rotation axis 16. It should also be noted that the running strip 26 advantageously has a hollow cross-section. The running surface of the rollers 24 is contoured or bulges in such a way as to ensure a virtually point-like contact of the rollers 24 with the conical running surface 34 along a circumference of contact. In order to ensure an optimum take-up of the forces by the deformable element 32, this circumference of contact coincides with the projection of the median line of the transverse cross-section of the cylinder 28 on the running surface.

FIG. 6 shows a segment of the compressible strip 32 intercalated between the running strip 26 and the almost infinitely rigid cylindrical wall 28. It can be seen that the compressibility of the strip 32 is cleverly achieved simply by providing the cylindrical wall 28, near the running strip 26, with oblong holes 40, the long axes of which are parallel to the running surface 34. These holes 40 are distributed in the wall 28 with a symmetry of revolution, preferably in two staggered rows, one above the other. It will be noted that the oblong holes 40 of the upper row are shifted in relation to the oblong holes of the lower row in such a way that they cover the material between two successive holes of the lower row. The effect of this particular arrangement of oblong holes 40 will be examined with the help of diagrams A and B in FIG. 6.

In the two diagrams A and B of FIG. 6, the elastic element 32 is modeled by two ideal beams 34' and 42' which are superposed. The beam 34' models, from the point of view of deformations, the running surface 34. The beam 42' models, from the point of view of deformations, a segment of material 42' located between the two rows of oblong holes 40. The beam 34' presses on the beam 42' by means of two elastic supports 44. The latter represent the spaces (i.e. the material of the wall) between the holes 40 of the lower row. These spaces are vertically below the holes 40 of the upper row and are then elastically deformable in the direction of these oblong holes. The beam 42' presses on rigid supports 46. The latter represent the material of the wall 28 vertically above the holes 40 of the lower row.

FIG. 6 shows the two virtual beams 34' and 42' in an undeformed state (reaction R=0). Diagram B shows the deformations of the two virtual beams 34' and 42' when a large local load $R_{max}$ is applied to the beam 34' vertically in line with the first rigid support 46. It can be seen that, between the supports 44, the beam 34' is freely deformed due to the presence of the hole 40 of the first (i.e., lower) row of holes. The rigid support 46, which models the almost infinitely rigid wall 28 above this hole, is practically unaffected by this deformation. In addition, the elastic supports 44 yield elastically under the load R because of the holes 40 of the upper row. The sum of these two deformations represents the local deformation of the running surface at the point of contact $P_i$ of the local force R. It should be noted that mathematical models of this structure with oblong holes, using finite elements for example, have made it possible to state that local elastic deformations of the element 32 can reach values which are, in the case of specific applications, far and away enough to affect substantially the distribution of the weight over the rollers, when a hopper of the type described above is supported by more than three rollers. That is, the elastic deformations are sufficient substantially to correct an unequal distribution of the weight of heavy body 14 over the rollers 24 resulting from slight deviations in coplanarity of the n rollers. These mathematical models of the structure with oblong holes have also made it possible to draw certain conclusion about the dimensioning of the oblong holes 40. Taking into account practical constraints related to the production of oblong holes, it is possible to summarize these conclusions as follows:

shape of holes: rectangular with rounded ends;

dimensions of holes: (a) the length L of a hole preferably corresponds to that of an arc of a circle subtending an angle of less than 10°, with the center of the circle being at the axis of rotation 16. In other words, $$L < \pi D \; (10°/360°)$$

where D is the mean diameter of circular running strip 34. (b) the height of a hole corresponds to about a quarter of its length;

arrangement of holes: two superposed rows of holes; the length of the space between two successive holes in a row is about 80% of the length of a hole; a hole of the second (i.e., upper) row is symmetrical with respect to the plane of symmetry of two adjacent holes in the first (i.e., lower) row.

One skilled in the art will be perfectly capable of optimizing or adapting these parameters for each case of application, by using for example a finite element method to model the case of application in question.

One skilled in the art will easily apply the information of the present invention to more than four rollers. In a device of the type shown in FIG. 1, four pairs of rollers separated from each other by 90° will preferably be used. On the platform 18, these pairs of rollers are then mounted at the four most rigid places of the platform 18, i.e. at the nodes of the link between the platform 18 and the superstructure 20.

The suspension device according to the invention has been described above by referring to a rotating hopper. It could however be applied to other heavy bodies rotating about an axis (for example, a tank, a rotating delivery chute, a rotating platform, etc.) when it is a question of using more than three supporting rollers to reduce the load per roller.

The preferred embodiment has been described as a configuration in which the supporting rollers 24 are mounted on support structure 18, 20, and the compressible elastic element 32 and running strip 26 are mounted on rotating body 14. However, it should be understood that the location of those elements can be reversed so that rollers 24 are mounted on rotating body 14 and compressible element 32 and running strip 26 are mounted on support structures 18, 20.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A suspension device for a heavy body rotating about a substantially vertical axis of rotation, including:

a running strip attached to said body, said running strip having an annular running surface therein;

at least n rollers positioned to engage and press against said running surface to support said body, wherein n is an integer greater than 3;

compressible elastic means between and connecting said running strip and said body to enable elastic deformation of said running surface about the points of contact between said rollers and said running surface;

said compressible elastic means being effective to permit elastic deformations sufficient to establish weight bearing contact between said n rollers and said running surface; and said compressible elastic means being effective to permit elastic deformations sufficient substantially to correct an unequal distribution of the weight of said body over said rollers resulting from slight defects in the coplanarity of said n rollers.

2. A suspension device as in claim 1, wherein:

said running strip is metallic; and said elastically compressible means comprise a metallic strip provided with generally oblong holes parallel to said running surface.

3. A suspension device as in claim 2, wherein:

the length of the oblong holes is less than $\pi D \; (10°/360°)$, where D is the mean diameter of said running strip.

4. A suspension device as in claim 3, wherein:

the ends of the oblong holes are rounded.

5. A suspension device as in claim 4 wherein:

the arrangement of said oblong holes has a symmetry of revolution about said axis of rotation.

6. A suspension device as in claim 5, wherein:

said running strip has a hollow cross-section.

7. A suspension device as in claim 5, wherein:

said running strip is segmented into n+1 annular segments.

8. A suspension device according to claim 1, including:

a supporting cylinder attached to said body, said cylinder being coaxial with said axis of rotation and having high rigidity; and an annular attaching flange attached to a first end of the said supporting cylinder;

said running strip being attached to the said flange;

the said supporting cylinder having, near said attaching flange, a segment having generally oblong holes parallel to the running surface, said segment defining said compressible elastic means.

9. A suspension device as in claim 8 wherein:

said generally oblong holes are arranged in an array of at least two rows of holes parallel to said running surface, the holes of a first row being shifted with respect to those of a second row.

10. A suspension device as in claim 9 wherein:

said holes of the second row are vertically below the spaces between the holes of the first row.

11. A suspension device as in claim 8, wherein:

the circumference of contact between said running strip and said rollers corresponds to the projection of the transverse cross-section of the said supporting cylinder.

12. A suspension device as in claim 1, wherein:

said running surface is a conical surface, the apex of the cone generating this conical surface being located on said axis of rotation, and each of said rollers having a convex bulging running surface.

13. A suspension device as in claim 1, wherein:

said running surface is attached to said rotating body; and said rollers are rigidly fixed to a supporting platform.

14. A suspension device for a heavy body rotating about a substantially vertical axis of rotation, including:

support means for supporting said body;

a running strip, said running strip having an annular running surface thereon;

at least n rollers positioned to engage and press against said running surface to support said body, wherein n is an integer greater than 3;

compressible elastic means between and connecting said running strip and said body to enable elastic deformation of said running surface about the points of contact between said rollers and said running surface;

said compressible elastic means being effective to permit elastic deformations sufficient to establish weight bearing contact between said n rollers and said running surface;

said n rollers being mounted on one of said support means and said body, and said compressible elastic means and said running strip being attached to the other of said support means and said body;

said compressible elastic means being effective to permit elastic deformations sufficient substantially to correct an unequal distribution of the weight of said body over said rollers resulting from slight defects in the coplanarity of said n rollers.

15. A suspension device as in claim 14, wherein:

said running strip is metallic; and said elastically compressible means comprise a metallic strip provided with generally oblong holes parallel to said running surface.

16. A suspension device as in claim 15 wherein:

said generally oblong holes are arranged in an array of at least two rows of holes parallel to said running surface, the holes of a first row being shifted with respect to those of a second row.

17. A suspension device as in claim 16, wherein:

said holes of the second row are vertically below the spaces between the holes of the first row.

18. A suspension device as in claim 15, wherein:

the length of the oblong holes is less than 10°.

19. A suspension device as in claim 18, wherein:

the ends of the oblong holes are rounded.

20. A suspension device as in claim 19, wherein:

the arrangement of said oblong holes has a symmetry of revolution about said axis of rotation.

21. A suspension device as in claim 20, wherein:

said running strip has a hollow cross-section.

22. A suspension device as in claim 21, wherein:

said running strip is segmented into n+1 annular segments.

23. A suspension device as in claim 14, wherein:

said running surface is a conical surface, the apex of the cone generating this conical surface being located on said axis of rotation, and each of said rollers having a convex bulging running surface.

* * * * *